(12) United States Patent  
Huber, Jr. et al.

(10) Patent No.: US 6,698,552 B2
(45) Date of Patent: Mar. 2, 2004

(54) PARKING BRAKE FOR A RAIL VEHICLE

(75) Inventors: Howard E. Huber, Jr., Black River, NY (US); Jeffrey F. Sauter, Louiville, NY (US); Zdzislaw Samulak, Watertown, NY (US); Lyle Jantzi, Adams, NY (US); Jerry Peck, Dexter, NY (US); Steven R. Newton, Adams, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 10/212,770

(22) Filed: Aug. 7, 2002

(65) Prior Publication Data

US 2003/0024774 A1 Feb. 6, 2003

Related U.S. Application Data

(63) Continuation-in-part of application No. 09/661,565, filed on Sep. 14, 2000, now Pat. No. 6,431,329.

(51) Int. Cl.[7] ................................................ B61H 13/00
(52) U.S. Cl. ........................................ 188/33; 188/265
(58) Field of Search ............................... 188/33, 219.1, 188/265, 153 R, 34, 52; 303/3, 15, 20, 13, 89

(56) References Cited

U.S. PATENT DOCUMENTS

| 3,107,754 A | 10/1963 | Bachman |
| 3,944,286 A | 3/1976 | Engle et al. |
| 4,019,426 A | 4/1977 | Wosegien et al. |
| 4,175,793 A | 11/1979 | Clemmons |
| 4,201,277 A | 5/1980 | Meier et al. |
| 4,215,767 A | 8/1980 | Shirey |
| 4,312,428 A | 1/1982 | Beacon |
| 4,385,548 A | 5/1983 | Persson et al. |
| 4,493,246 A | 1/1985 | Dalibout |
| 4,653,812 A | 3/1987 | Engle |
| 4,733,602 A | 3/1988 | Smith et al. |
| 4,840,257 A | 6/1989 | Harrison |
| 4,874,065 A | 10/1989 | Engle |
| 4,921,076 A | 5/1990 | Grenier et al. |
| 4,978,178 A | 12/1990 | Engle |
| 5,069,312 A | 12/1991 | Kanjo et al. |
| 5,361,876 A | 11/1994 | Haverick et al. |
| 5,495,921 A | 3/1996 | Samulak et al. |
| 5,701,974 A | 12/1997 | Kanjo et al. |
| 5,701,975 A | 12/1997 | Hawryszkow |
| 5,738,416 A | 4/1998 | Kanjo et al. |
| 6,082,502 A | 7/2000 | Hawryszkow |
| 6,186,284 B1 | 2/2001 | Sauter et al. |
| 6,241,057 B1 | 6/2001 | Hiatt |
| 6,264,288 B1 * | 7/2001 | Dreese .................. 303/13 |
| 6,279,689 B1 | 8/2001 | Zemyan |

* cited by examiner

Primary Examiner—Jack Lavinder
Assistant Examiner—Melanie Torres
(74) Attorney, Agent, or Firm—Barnes & Thornburg

(57) ABSTRACT

The present invention is a parking brake for a rail vehicle having a brake cylinder and a piston in the brake cylinder responsive to forces to apply and release the brakes on the vehicle. The parking brake further includes at least one off-center connecting rod extending though an opening in the brake cylinder and connected to the piston through that opening. The parking brake also includes a force multiplier supported by the brake cylinder and connected to the at least one off-center connecting rod. Further included is an actuator connected to the force multiplier for driving the force multiplier to provide the force to move the at least one rod and the piston to move the brakes to an apply position.

41 Claims, 14 Drawing Sheets

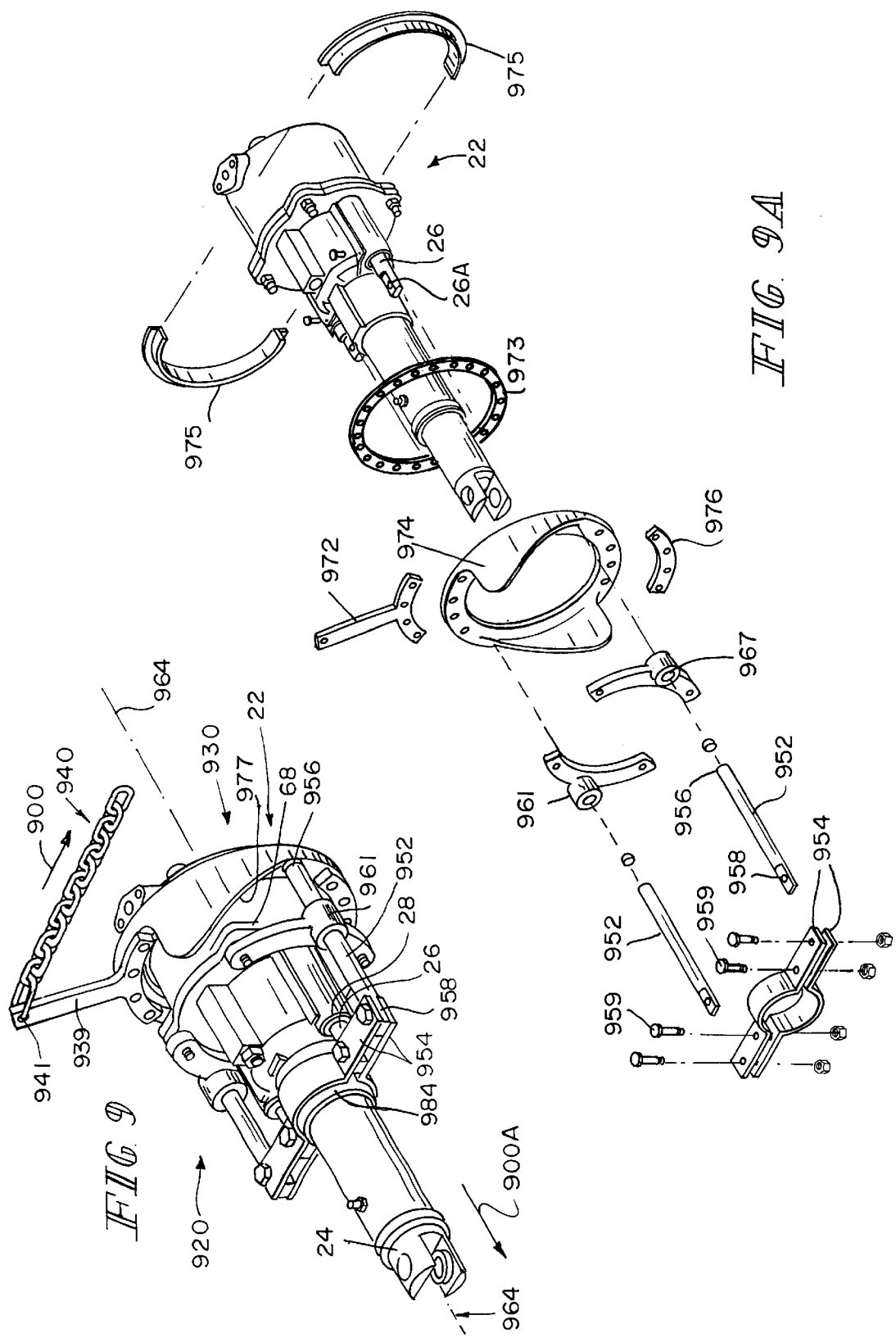

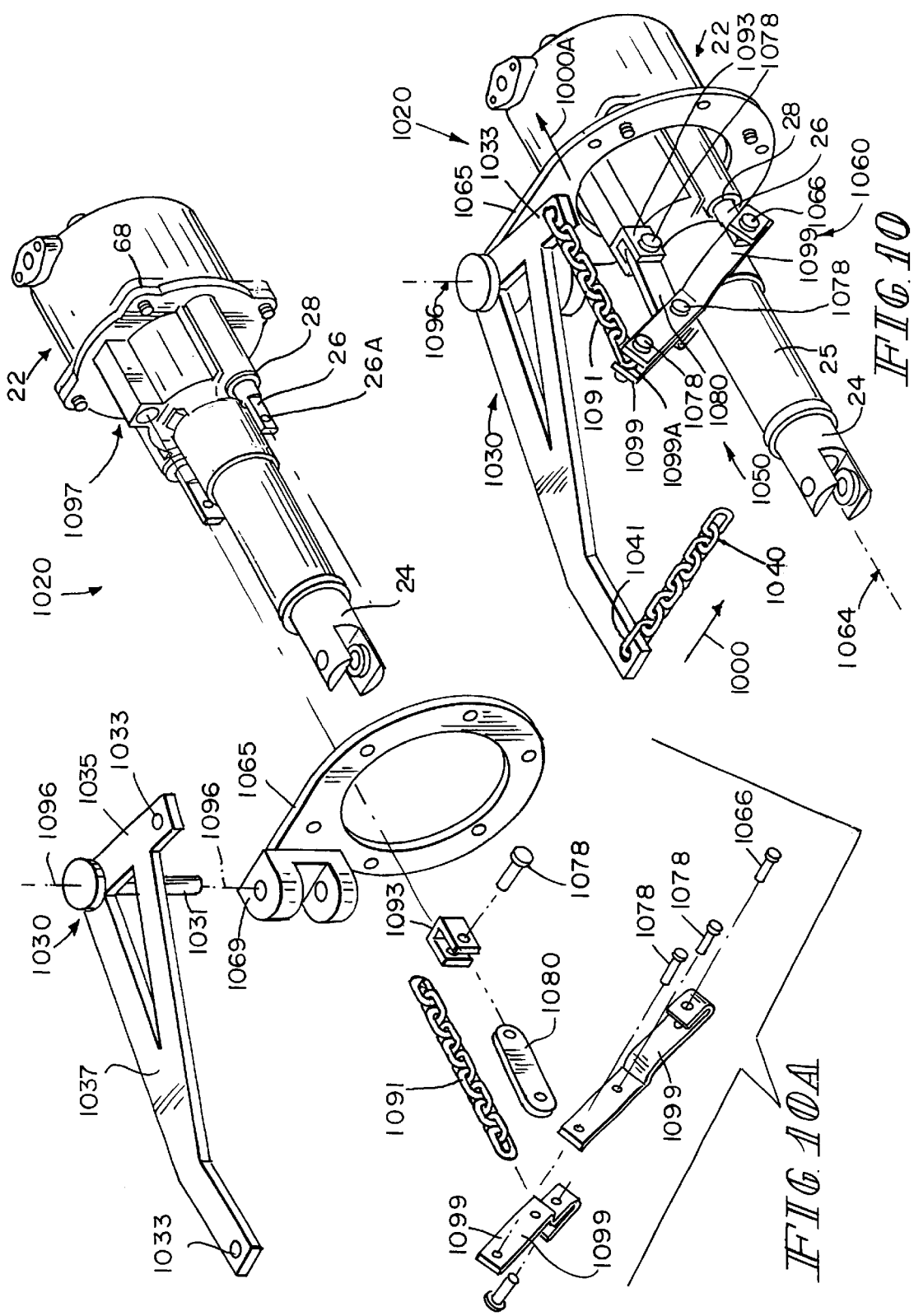

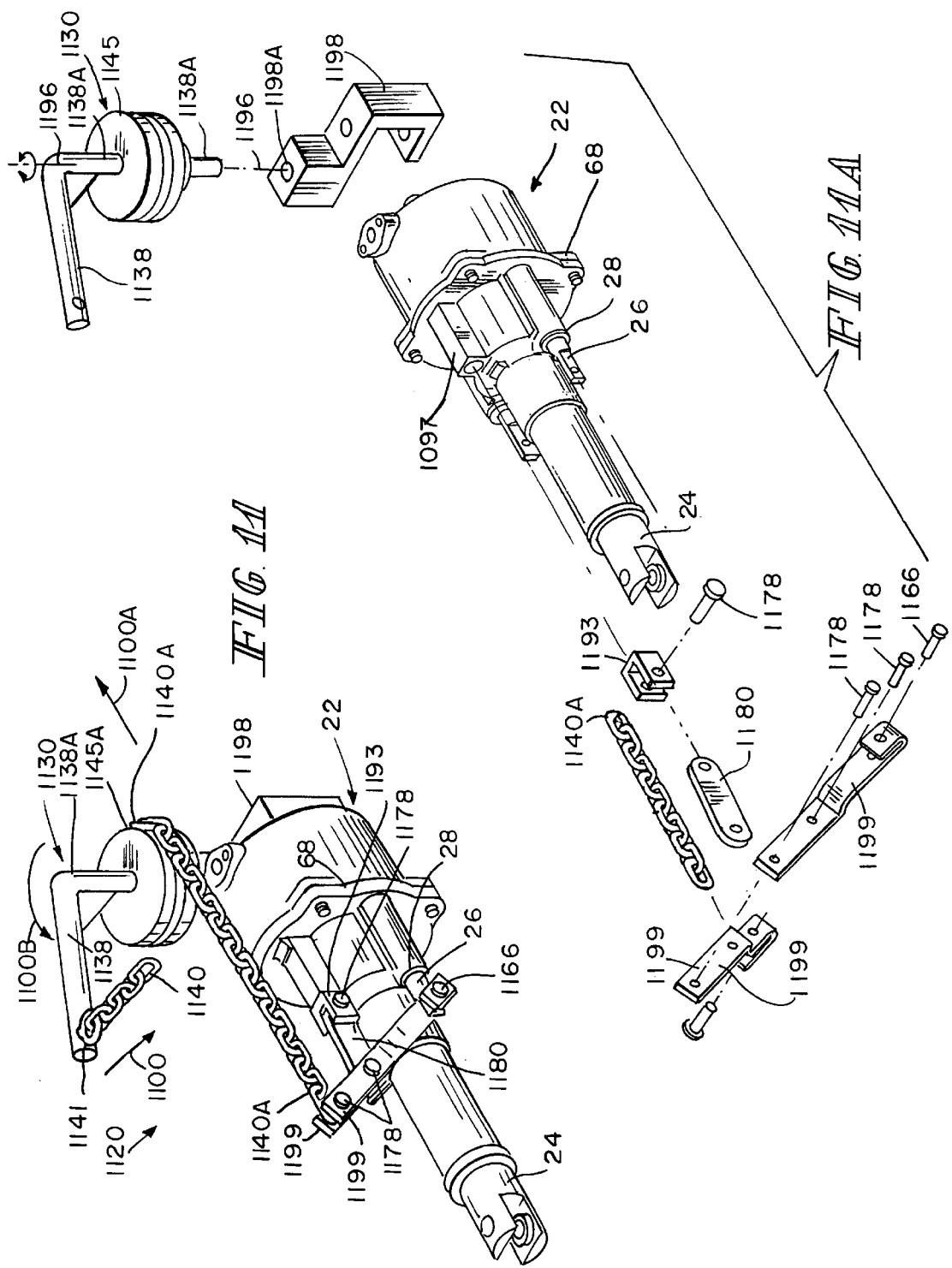

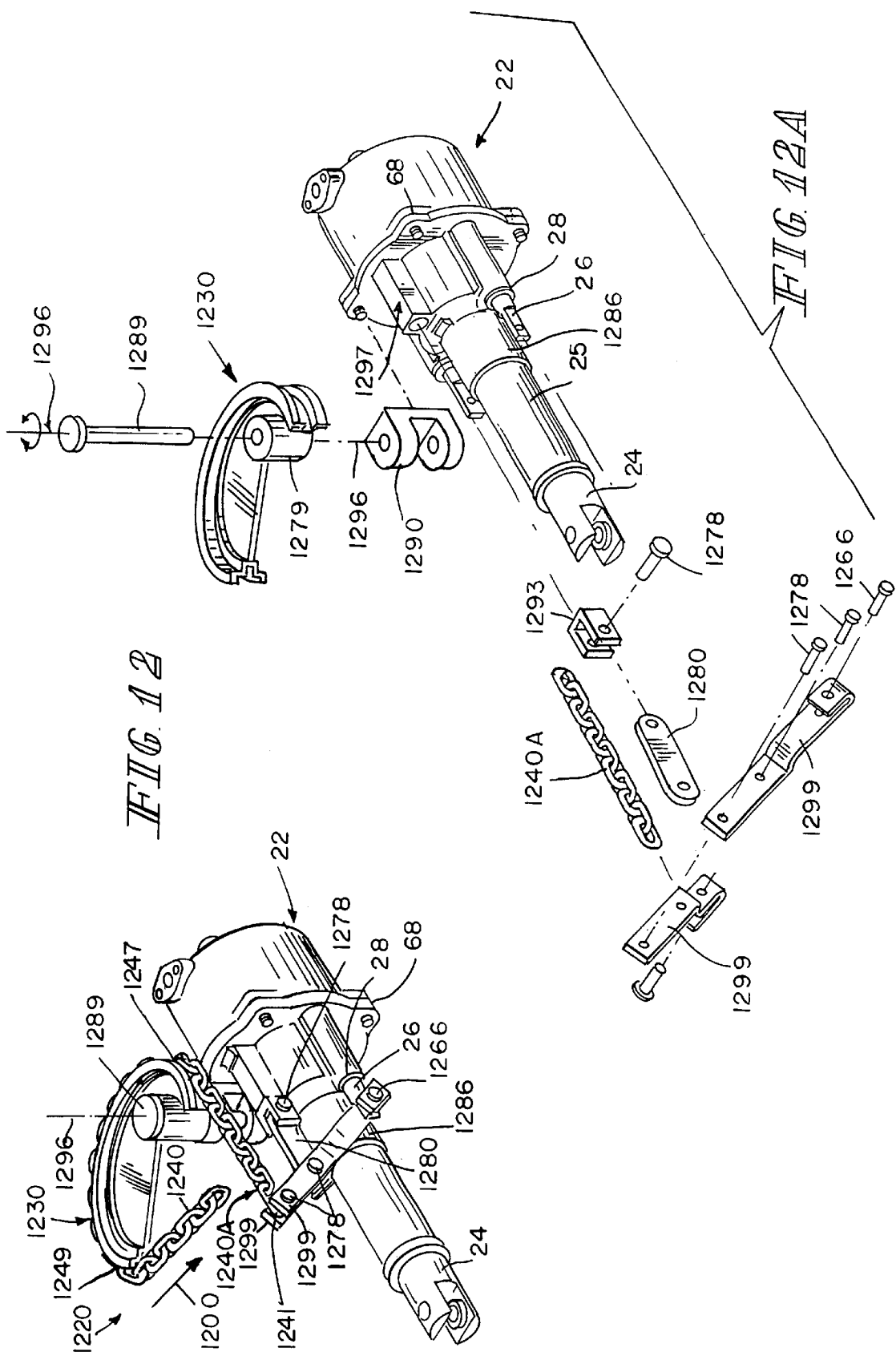

PARKING BRAKE FOR A RAIL VEHICLE

This application is a Continuation-In-Part of U.S. patent application Ser. No. 09/661,565, filed Sep. 14, 2000, now U.S. Pat. No. 6,431,329 which is now pending.

BACKGROUND AND SUMMARY OF THE INVENTION

The present invention relates generally to parking brakes for rail vehicles and more specifically to a parking brake with an actuator, and a force multiplier that is connected to a brake cylinder piston which applies and releases the brakes on a rail car.

The prior art discloses a number of parking brake systems for rail vehicles. Some of the parking brake systems operate independently of the overall brake system for the train and others are integrated with the overall brake system, particularly by using the main brake cylinder that operates the train's brakes.

In general, brake systems for rail vehicles are pneumatically (air) operated. The brake system includes a brake cylinder with a piston rod to operate the brake shoes to engage the rail car wheels and brake the rail car. The brake cylinder receives a signal to apply the brakes and generally has a spring return to release them. The signal or force to activate the brakes is generally multiplied by some sort of lever that is located between a brake cylinder actuator and the brake shoes. Other brake cylinders may be spring applied and air released.

Most rail cars have a manually-operated parking brake that applies the wheel brakes. Generally, for truck-mounted brake systems, which are well-known in the art, one end of the brake cylinder has a piston rod output that is connected to levers or similar elements which connect the brake cylinder to the brake beams. Furthermore, as part of the parking brake system, a combination of chains and cables are generally used to connect the brake cylinder to a manually-operated actuating device. That connection often includes a multiplier lever. The multiplier lever is connected to a convenient location on the rail car.

The prior art also discloses an electropneumatic controlled parking brake, that is one that has electrical and pneumatic elements.

Manual fluid pumps to actuate separate hydraulic parking brakes on railroad vehicles are also disclosed in the prior art. Those parking brakes are connected to the brake beams and may or may not be independent of the main brake cylinder.

Some rail car users or operators may prefer to eliminate the use of cables to connect the brake cylinder to a multiplier lever because of brake system complexity and cost, or for other reasons. Users may also like to have additional options as to where the multiplier levers could be located or positioned as part of any parking brake system. The present invention addresses those concerns and interests.

The present invention is a parking brake for a rail vehicle having a brake cylinder and a piston in the brake cylinder responsive to forces to apply and release the brakes on the vehicle. The brake cylinder may have a pressure side and a non-pressure side. The parking brake further includes at least one off-center connecting rod extending though an opening in the brake cylinder and connected to or with the piston through that opening. The opening may be on the pressure or non-pressure side of the brake cylinder. The at least one off-center connecting rod may function as an anti-rotational rod. The parking brake also includes a force multiplier connected to or with the at least one rod. Further included is an actuator connected to or with the force multiplier for driving the force multiplier to provide the force to move the at least one rod and the piston to move the brakes to an apply position.

In this application, an element may be connected to or with another element, meaning that the connection may be direct or indirect regardless of whether the word "to" or "with" is used to describe the connection. Either "to" or "with" may be used herein, and they are interchangeable.

Other features of the present invention will become apparent from the following detailed description of the invention when considered in conjunction with the accompanying drawings.

BRIEF DESCRIPTION OF THE DRAWINGS

FIG. 4A is an exploded view of the parking brake of FIG. 4.

FIG. 5A is an exploded view of the parking brake of FIG. 5.

FIG. 6A is an exploded view of the parking brake of FIG. 6.

FIG. 7A is an exploded view of the parking brake of FIG. 7.

FIG. 9 is a perspective view of a sixth embodiment of a parking brake according to the principles of the present invention.

FIG. 9A is an exploded view of the parking brake of FIG. 9.

FIG. 10 is a perspective view of a seventh embodiment of a parking brake according to the principles of the present invention.

FIG. 10A is an exploded view of the parking brake of FIG. 10.

FIG. 11 is a perspective view of an eighth embodiment of a parking brake according to the principles of the present invention.

FIG. 11A is an exploded view of the parking brake of FIG. 11.

FIG. 12 is a perspective view of a ninth embodiment of a parking brake according to the principles of the present invention.

FIG. 12A is an exploded view of the parking brake of FIG. 12.

DETAILED DESCRIPTION OF THE PREFERRED EMBODIMENTS

Figure 1:
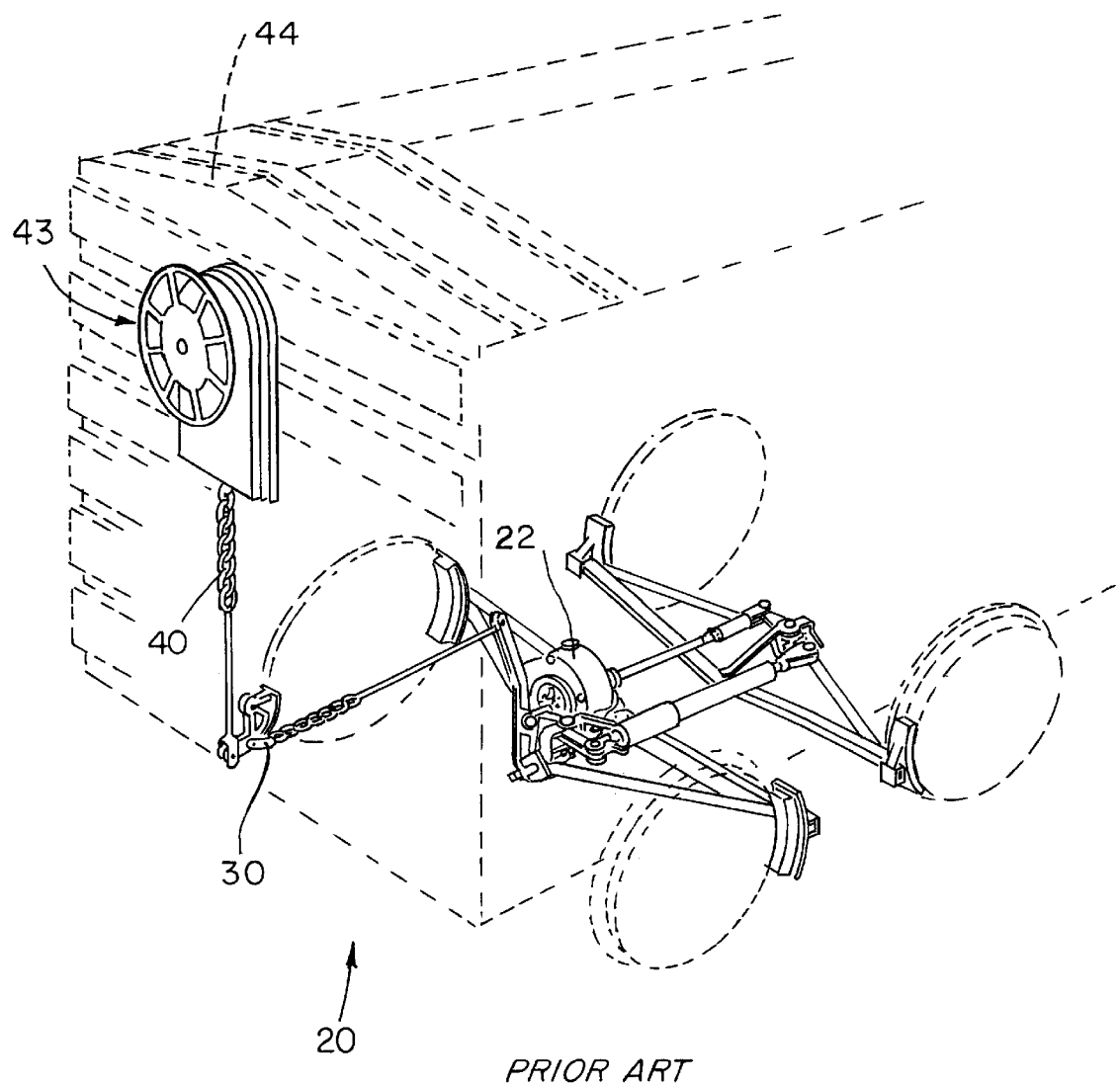
FIG. 1 is a perspective view of a prior art truck-mounted parking brake mounted on a rail car.

Parking brakes on rail vehicles are well known in the art. Generally, as shown in the prior art of FIG. 1, a parking brake or hand brake system includes an actuator, such as a hand wheel 43 and chain 40 as well as a force multiplier 30 mounted to the end of a rail car 44. The actuator chain 40 can be connected to a brake cylinder 22, for instance, through a series of handles and transfer levers (not identified for sake of clarity). Applying a force to the actuator chain 40, for example, by turning the wheel 43, pulls the chain 40 and ultimately transfers the pulling force to the brake cylinder 22 which applies the brakes to the rail car's wheels.

Figure 2:
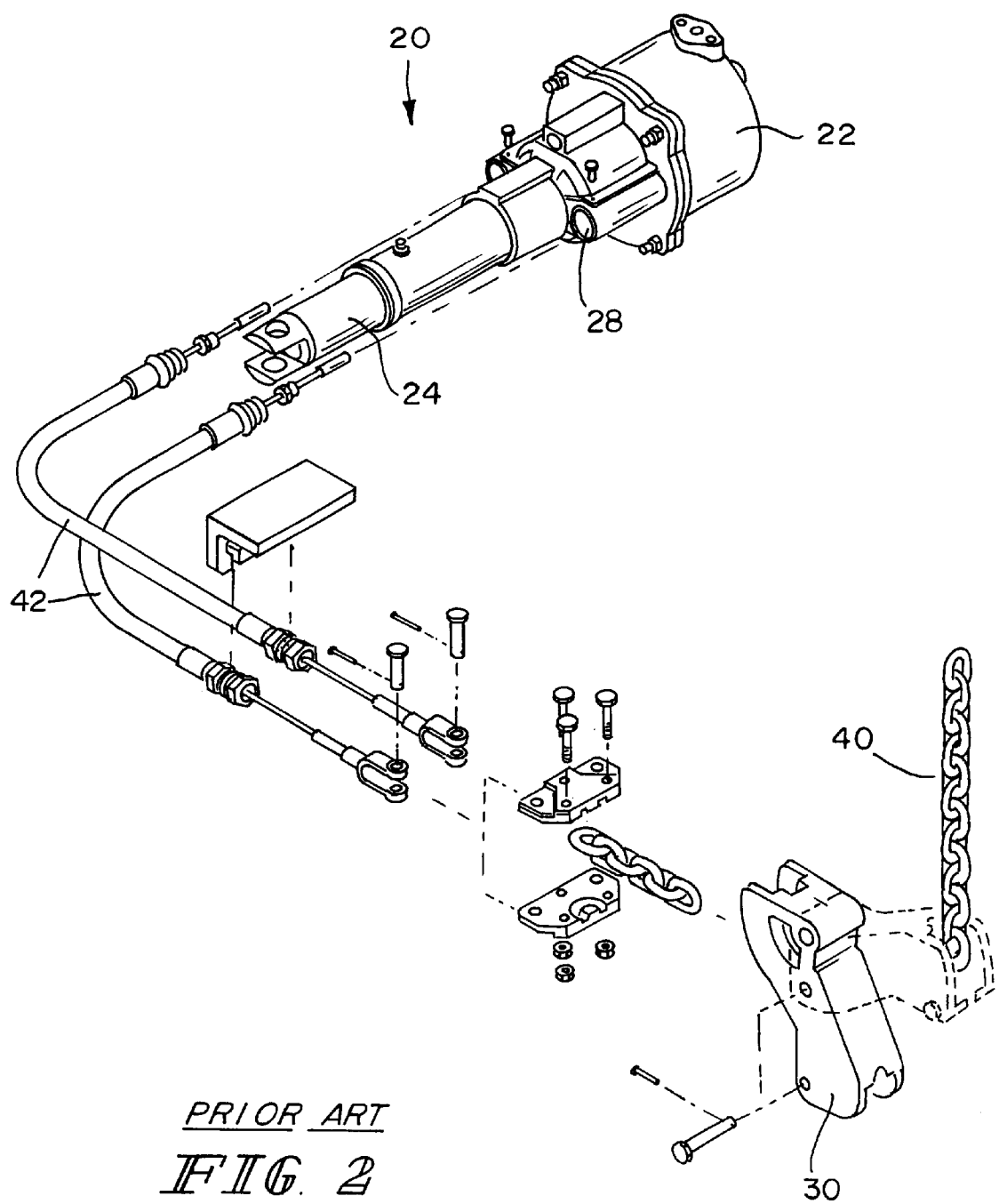
FIG. 2 is an exploded perspective view of a prior art parking brake system having a multiplier connected to brake cables that are connected to a brake cylinder.

FIG. 2 illustrates a prior art mechanical parking or hand brake 20 wherein a pair of hand brake cables 42 are connected on one end to a piston (not shown) through openings 28 in the brake cylinder 22. On the other end, the cables are connected to force multiplier 30 and actuator chain 40. Actuator chain 40 can be connected to an actuator wheel 43 mounted on a rail car, as shown in FIG. 1.

The parking brake of the present invention is shown in FIGS. 3–13.

Figure 3:
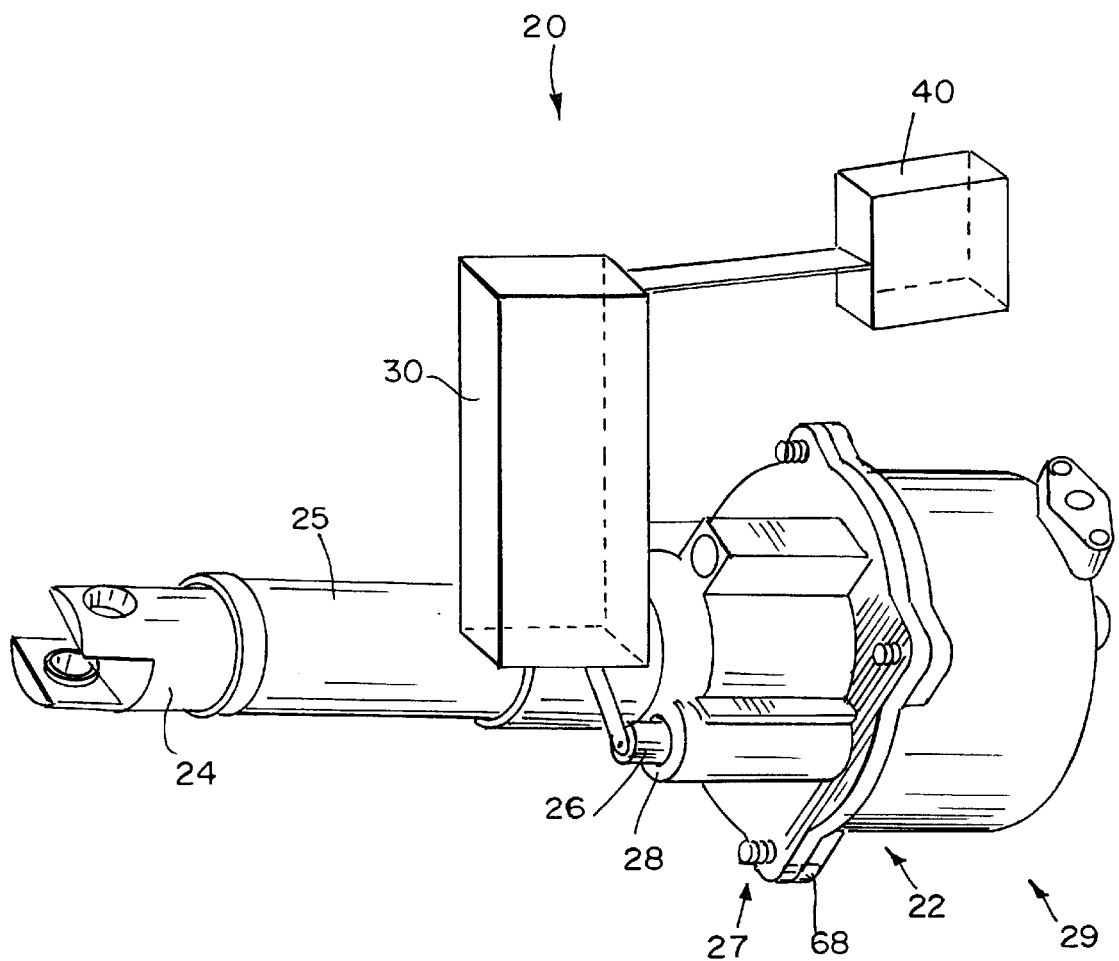
FIG. 3 is a perspective, schematic view of a parking brake according to the principles of the present invention.

FIG. 3 shows a parking brake 20 for a rail vehicle that includes a brake cylinder 22 and a piston (not shown) inside the brake cylinder that is responsive to forces to apply and release brakes on the vehicle via piston rod 24, which rides inside piston rod sleeve 25. The parking brake 20 also includes at least one off-center connecting rod 26, that extends through at least one opening 28 in the a brake cylinder 22. The at least one off-center connecting rod 26 is connected to the piston (not shown) through the at least one opening 28. The parking brake 20 further includes a force multiplier 30 (shown schematically) that is connected to or supported by the brake cylinder 22 and connected to the at least one off-center connecting rod 26. Also included in parking brake 20 is an actuator 40 (shown schematically) connected to the force multiplier 30. The actuator 40 may also be connected directly to or located within brake cylinder 22. The actuator 40 provides the force to move the at least one off-center connecting rod 26 via multiplier 30 and the piston (not shown) to move the brakes to an applied position.

The brake cylinder piston is not shown in any of the embodiment figures and, when referred to, will hereafter be referred as the piston without identifying the piston with a numerical designation. The piston is connected to a piston rod 24 that extends from the brake cylinder 22 and the rod 24 may be enclosed in a piston rod sleeve 25. A flange 68 is generally included and used to mate the non-pressure side 27 and a pressure side 29 (as shown in FIG. 3) of the brake cylinder 22.

Generally, the parking brake of the present invention, as shown in FIG. 3, works as follows. The actuator 40 applies a force to the force multiplier 30 that is connected to or supported by the brake cylinder 22. The force multiplier 30 moves the at least one off-center connecting rod 26. The at least one off-center connecting rod 26, being connected to a piston (not shown) in the brake cylinder 22, drives the piston rod 24 which moves the brakes (not shown) to an applied position on the vehicle's wheels (not shown).

FIGS. 3–13 show the preferred embodiments of the parking brake of the present invention.

It should be noted that except for the numerical designation of the parking brake (e.g., 120 for the first embodiment (FIGS. 4 and 4A); 220 for the second embodiment (FIGS. 5 and 5A), etc.) certain elements designated and described in the first embodiment are also included in other embodiments of this invention. Those elements are commonly numbered and their function in each of the other embodiments is essentially identical to that described in the first embodiment except where noted otherwise in each embodiment. Those elements include brake cylinder 22, piston rod 24, piston rod sleeve 25, off-center connecting rod 26, non-pressure side 27, opening 28, pressure side 29 and flange 68. Even though all of these elements and their function are included in each of the embodiments (FIGS. 4–12A), their description and function will not necessarily be repeated in each of the succeeding embodiments. Also, generally, elements with the identical last two numerical digits have similar functions and their number increases by adding at least 100 to those last two digits in each succeeding embodiment (e.g., pin 166 in the first embodiment (FIGS. 4 and 4A) essentially performs the same function as pin 1266 in the ninth embodiment (FIGS. 12 and 12A), but may perform that function or be used on or between different elements).

First Embodiment

Figure 4:
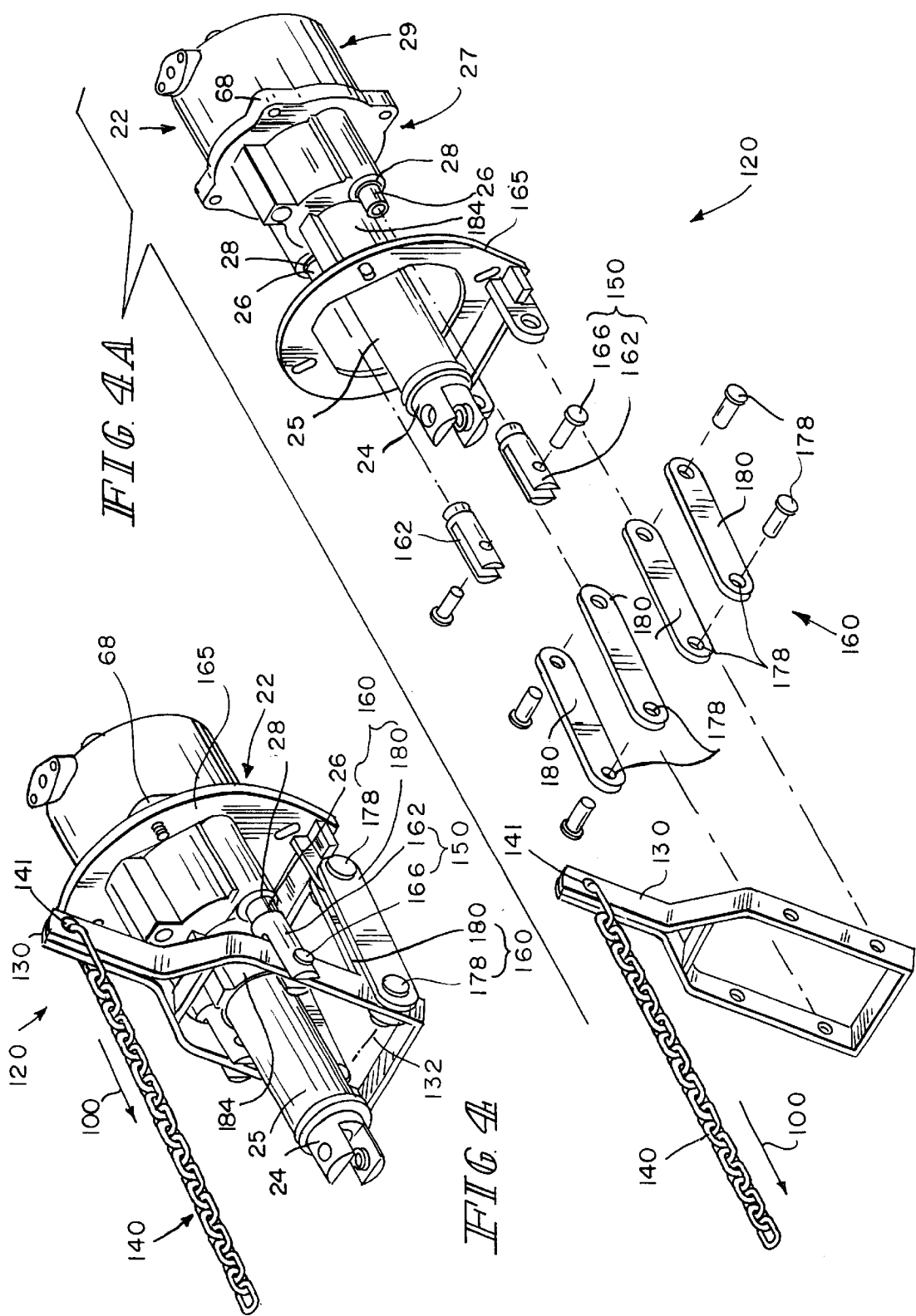
FIG. 4 is a perspective view of a first embodiment of a parking brake according to the principles of the present invention.

A first embodiment, shown in FIGS. 4 and 4A, is parking brake 120 that includes the brake cylinder 22 with a piston (not shown) inside the brake cylinder 22.

The parking brake 120 also includes at least one off-center connecting rod 26 that extends though an opening 28 in the non-pressure side 27 of the brake cylinder 22 and is connected to the piston through the opening 28. While FIGS. 4 and 4A show or indicate that there are two off-center connecting rods 26, one with ordinary skill in the art would know how to make the present invention with one off-center connecting rod 26 or with more than two off-center connecting rods 26.

Also, the off-center connecting rod(s) 26, as shown in FIGS. 3–13, may be located or positioned at other places on the non-pressure side 27 of the brake cylinder 22. For example, the off-center connecting rods 26 shown in FIGS. 6 and 6A have been rotated 90° from their position shown in FIGS. 4 and 4A.

Parking brake 120 also includes a force multiplier 130 shown as a bifurcated closed fork or a Y-shaped lever in FIGS. 4 and 4A. Other shapes of force multipliers or levers are contemplated. The force multiplier 130 is supported by the brake cylinder 22 by non-flexible linkage 160. The linkage 160 is connected to a boss or mounting plate 165, which is connected to flange 68. Linkage 160 may include links 180 and pins 178. Force multiplier 130 may also be pivotally connected to the at least one connector rod 26 by assembly 150, which may include clevis or clevis-like element 162 and pin 166. Clevis 162 may be mounted on, or be a part of, the end of the off-center connecting rod 26. Parking brake 120 also includes an actuator 140, shown as a chain. Chain 140 may be connected to force multiplier 130 at connection point 141.

Force multiplier 130 includes a lever connected to actuator 140 at a first position 141 on the lever 130 and is connected to the at least one off-center connecting rod 26 at a second position, pin 166, on the lever 130 and is supported by the brake cylinder 22 at a third position, pin 178, on the lever 130. It is possible, in this and other embodiments, that the second position may be between the first and third positions on the lever (as is the case in this embodiment), or the third position may be between the first and second positions on the lever (as in the third embodiment, shown as FIGS. 6 and 6A).

When a force is applied to actuator or chain 140, force multiplier 130 is pulled in direction 100. Multiplier 130 pivots about the substantially fixed pivot point or axis 132, which is defined by pin 178 that connects link 180 to force multiplier 130. The pivot axis 132 is located below off-center connecting rod 26 as viewed from the top of force multiplier 130 at connection point 141. Stated another way, the connection, at pin 166, of the multiplier 130 to the off-center connecting rod 26 is between the connection, at point 141, of the multiplier 130 to the actuator 140 and the connection, at pin 178, connecting the brake cylinder 22 to the force multiplier 130.

As multiplier 130 is pulled to the left (as shown in FIGS. 4 and 4A), connector rod 26 is pulled to the left as well. Off-center connecting rod 26, being connected to the piston inside brake cylinder 22, drives piston rod 24, which rides inside piston rod sleeve 25. Sleeve 25 fits inside brake cylinder extension 184. Cylinder extension 184 may be connected integrally to or cast monolithically with brake cylinder 22. Piston rod 24 in turn moves the brakes (not shown) to an apply position on the rail vehicle's wheels.

Force multiplier 130, as do the force multipliers in the other embodiments herein, performs at least two functions. First, it multiplies the force that is applied at connection point 141 through actuator 140, and applies that multiplied force to connector rod 26 through connector assembly 150. Second, multiplier 130 inversely multiplies the distance traveled by chain 140 and causes connector rod 26 to move a distance that is inversely proportional to the distance traveled by chain 140. Generally, the "multiplier ratios" for the force and distance multipliers of the present invention range generally from approximately 1:1 to 4:1 for the force multiplier and 1:1 to 1:4 for the distance multiplier. That is, for example, for an approximately three inch movement of the chain 140 there will be approximately a one inch movement of the off-center connecting rod 26. For the force component, if approximately 3,000 lbs. of pull force is applied at connection point 141, there will be approximately 9,000 lbs. of pull force applied to off-center connecting rod 26. For the present invention's best mode of operation, the force ratio is expected to be approximately 3:1 and the distance ratio is expected to be 1:3, Other ratios are also contemplated.

Second Embodiment

Figure 5:
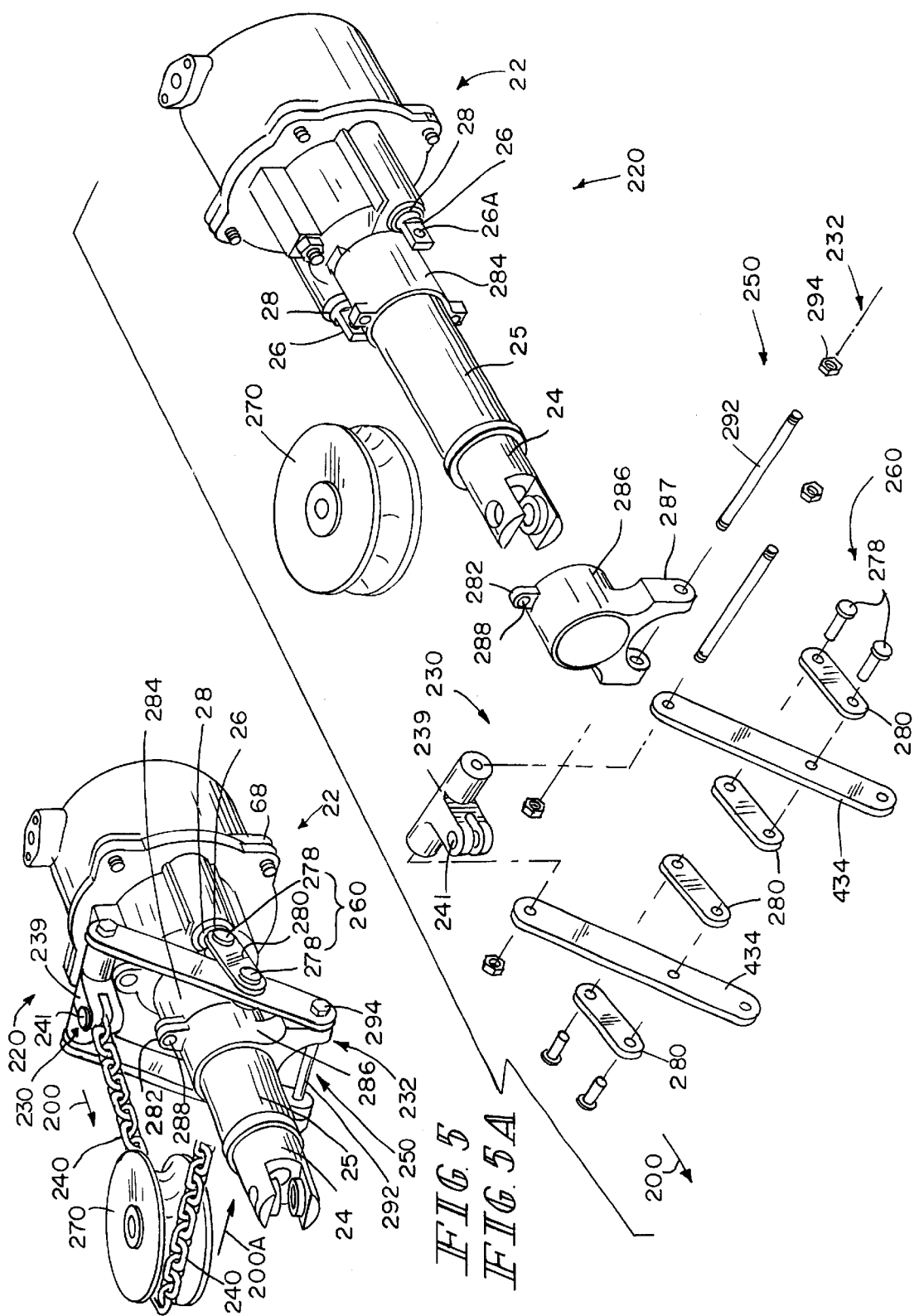
FIG. 5 is a perspective view of a second embodiment of a parking brake according to the principles of the present invention.

A second embodiment, shown in FIGS. 5 and 5A is parking brake 220. The force multiplier 230 is a bifurcated U-shaped lever which may include legs 434. Force multiplier 230 is supported by, and may be pivotally connected to, the brake cylinder 22 through assembly 250. Assembly 250 may include a collar 286 that fits around piston rod sleeve 25 and may have a boss 282 with a hole 288 for connection to a cylinder extension boss 285 on cylinder extension 284. Assembly 250 may also include pin 292 and nut 294 extending through holes in boss 287. Collar 286 may also be connected integrally to, or cast monolithically with, brake cylinder 22.

Force multiplier 230 is connected to the at least one off-center connecting rod 26 by linkage 260, which may include two links 280 and two connector pins 278 for each rod 26. Linkage 260 may connect to rod 26 through opening 26A.

Parking brake 220 also includes an actuator 240, shown as a chain, which may be connected to the force multiplier 230 at connection point 241 on handle 239 of force multiplier 230.

Thus, the force multiplier 230 includes a lever connected to actuator 240 at a first position 241 on the lever 230 and is connected to the at least one off-center connecting rod 26 at a second position, pin 278, on the lever 230 and is supported by the brake cylinder 22 at a third position, pin 292, on the lever.

When a force is applied to actuator or chain 240, force multiplier 230 is pulled in direction 200. Force multiplier 230 pivots about the substantially fixed rotational axis 232, which may be defined generally by the longitudinal axis of pin 292. As in FIG. 4, pivot axis 232 is located below off-center connecting rod 26 as viewed from the top of force multiplier 230 at connection point 241. Stated another way, the connection, at pin 278, of the multiplier 230 to the off-center connecting rod 26 is between the connection of the force multiplier 230, at point 241, to the actuator 240 and the connection, at pin 292, connecting the brake cylinder 22 to the force multiplier 230.

As force multiplier 230 is pulled to the left in direction 200 (as shown in FIGS. 5 and 5A), off-center connecting rod 26 is pulled to the left as well, and the brakes are moved to an apply position as described in the first embodiment.

This embodiment also includes a sheave wheel 270 that may change the pull direction 200 to pull direction 200A. Pull direction 200A differs by approximately 90° from pull direction 200. Sheave wheel 270 may be mounted on the rail car, the rail car truck or other appropriate location.

A change in the direction of pull may be dictated by where, for instance, an actuator wheel 43 or equivalent device (see FIG. 1) is located and where and how the brake cylinder 22 is mounted on the rail car truck. A sheave wheel, such as sheave wheel 270, may thus be used to change direction of pull from a "end of car" actuator wheel mounting location (such as shown in FIG. 1) to a "side of car" location (not shown) or vice versa. If desired, more than one sheave wheel can be used. In addition, one or more sheave wheels may be used with all of the present embodiments.

Third Embodiment

Figure 6:
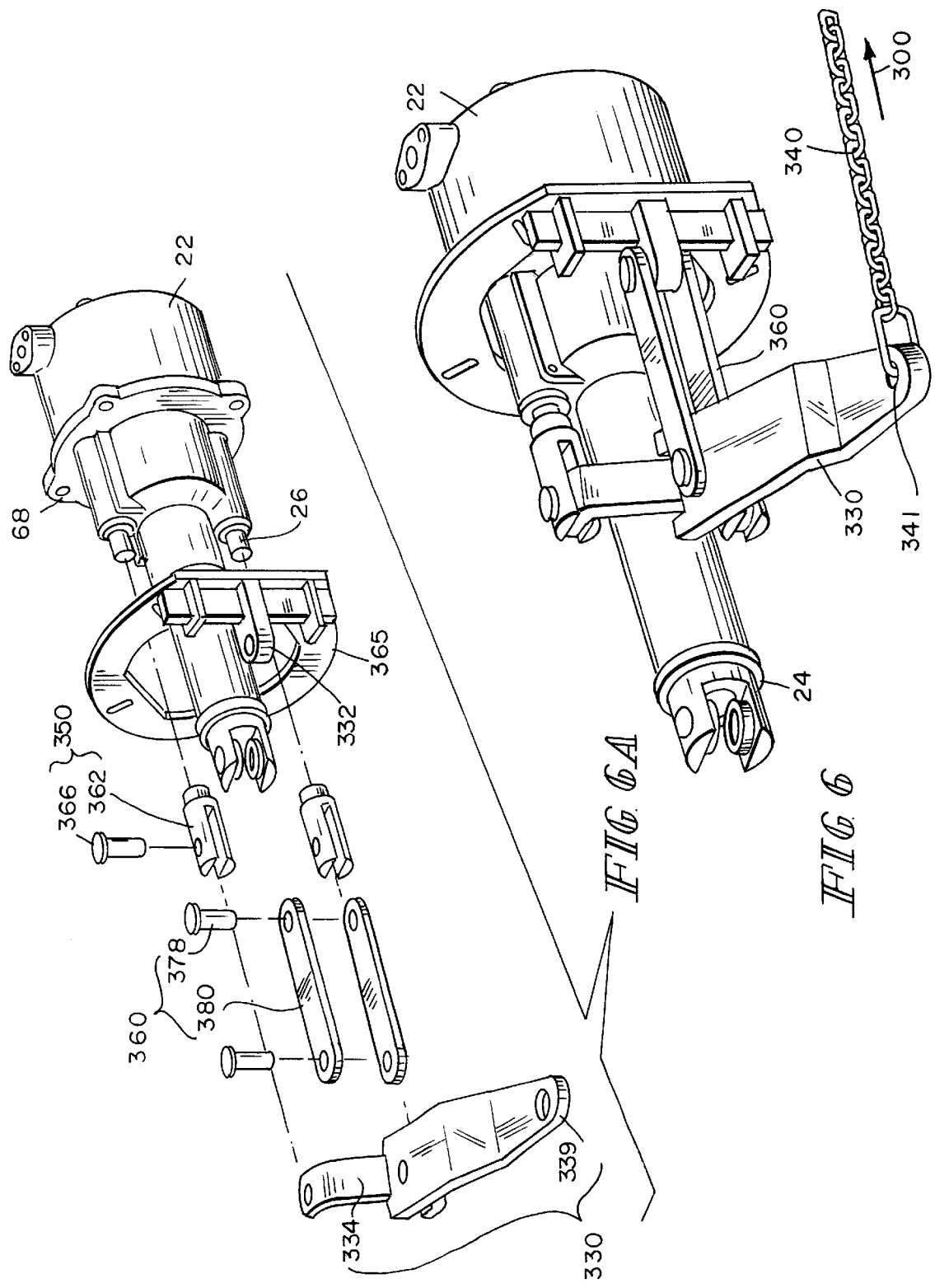
FIG. 6 is a perspective view of a third embodiment of a parking brake according to the principles of the present invention.

A third embodiment, shown in FIGS. 6 and 6A, is parking brake 320. The force multiplier 330 is a single-handle, Y-shaped lever, which may include legs 334 and handle 339. The legs 334 may be a single unit and curved, as shown in FIGS. 6 and 6A, or the legs may be shaped in a different configuration. The handle 339 may include one or more pieces. The handle 339 and legs 334 may be integrally connected, for instance, by welding or cast as a monolithic unit. Also, force multiplier 330 may be a bifurcated fork lever similar to force multiplier 130, as shown in FIGS. 4 and 4A.

Force multiplier 330 is supported by brake cylinder 22 by linkage 360. Linkage 360 is connected to a boss or mounting plate 365, which is connected to flange 68. Linkage 360 may include links 380 and pins 378. Force multiplier 330 may also be pivotally connected to the at least one off-center connector rod 26 by assembly 350, which may include clevis 362 and pin 366.

Parking brake 320 also includes an actuator 340, shown as a chain. Chain 340 may be connected to force multiplier 330 at connection point 341.

Thus, force multiplier 330 includes a lever connected to actuator 340 at a first position 341 on the lever 330 and is connected to the at least one off-center connecting rod 26 at a second position, at pin 378, on the lever 330 and is supported by the brake cylinder 22 at a third position, at pin 366, on the lever.

When a force is applied to actuator or chain 340, force multiplier 330 is pulled in direction 300. Pull direction 300 is in the opposite direction of the pull directions in the first and second embodiments, as shown in FIGS. 4–5A. Multiplier 330 pivots about the substantially fixed pivot point or axis 332, which is defined by pin 378 that connects link 380 to force multiplier 330. The pivot axis 332 is located above off-center connecting rod 26, as viewed from the top of force multiplier 330 at connection point 341. Stated another way, the connection, at pin 378, of the multiplier 330 to the off-center connecting rod 26 is between the connection, at point 341, of the force multiplier 330 to the actuator 340 and the connection, at pin 366, connecting brake cylinder 22 to the force multiplier 330.

As multiplier 330 is pulled to the right (as shown in FIGS. 6 and 6A), off-center connecting rod 26 is pulled to the left. Off-center connecting rod 26, being connected to the piston inside brake cylinder 22, drives piston rod 24 to the left as well. Piston rod 24, in turn, moves the brakes (not shown) to an applied position on the rail vehicle's wheels (not shown).

It is noted that the at least one off-center connecting rod 26 has been rotated approximately 90° from the position of the off-center connecting rod 26, as shown in FIGS. 4 and 4A and other embodiments. The off-center connecting rod or rods 26 of embodiments 1–6 herein may be rotated from the positions shown in FIGS. 4–9A.

Fourth Embodiment

Figure 7:
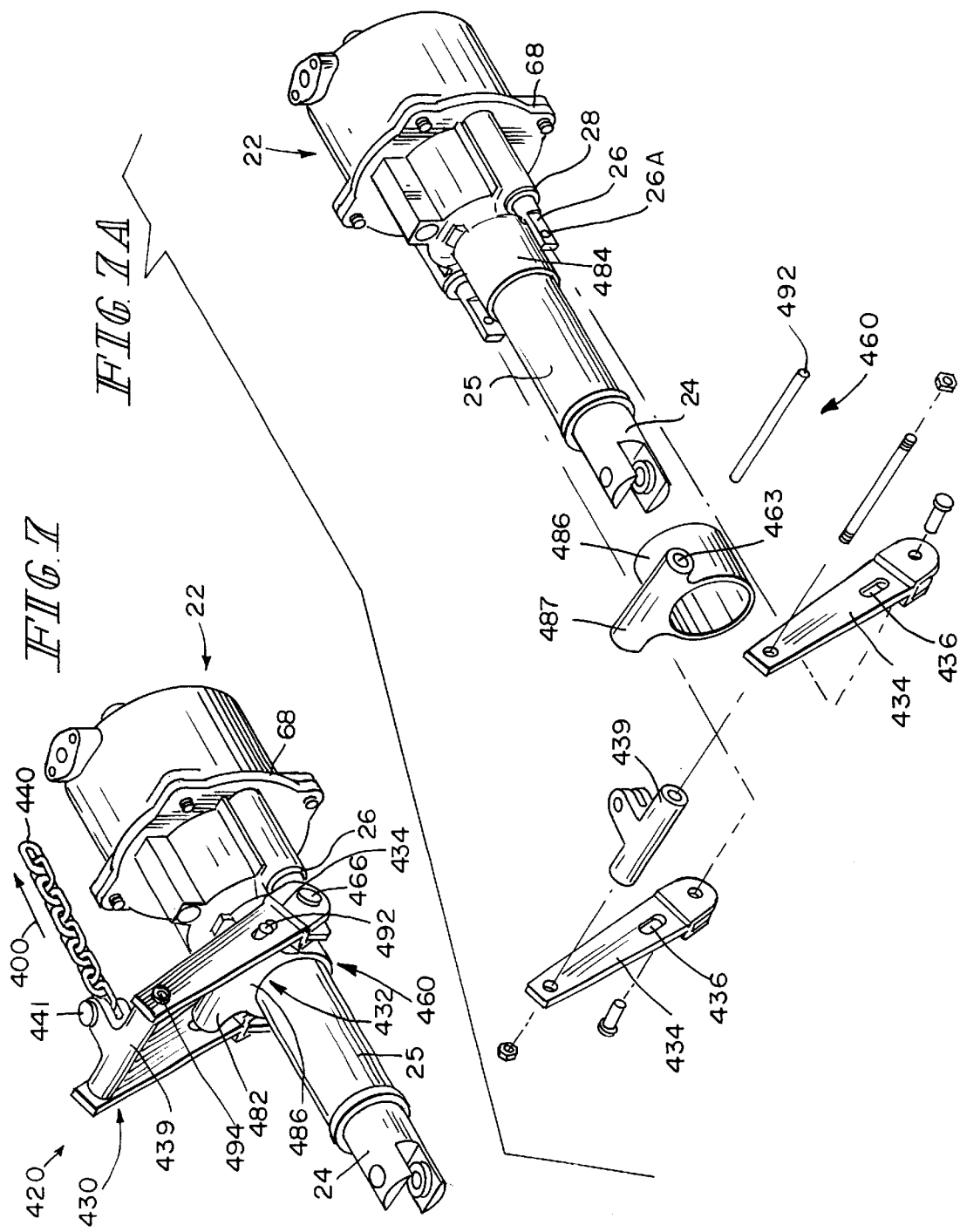
FIG. 7 is a perspective view of a fourth embodiment of a parking brake according to the principles of the present invention.

A fourth embodiment, shown in FIGS. 7 and 7A, is parking brake 420. The force multiplier 430 is a bifurcated U-shaped lever. The force multiplier 430 is supported by the brake cylinder 22 through an assembly 450. Assembly 450 may include collar 486, which fits around piston sleeve 25 and may also include a collar boss 487 with hole 463. Assembly 450 may also include pin 492, which may be inserted through opening 436 on force multiplier leg 434.

The opening 436 on leg 434 may be oblong in shape or of whatever shape and size will permit substantially arcuate and somewhat vertical movement of force multiplier 430 that occurs when force multiplier 430 is pulled in direction 400 (or, is moved in the reverse direction by a spring or similar device (not shown)). The force in pull direction 400 causes force multiplier 430 to pivot about an axis 432 defined by pin 492. Pin 492 has a smaller diameter than the diameter of opening 436, shown as an oblong opening in FIGS. 7 and 7A. Alternatively, a similar oblong-type opening can be placed, instead, at the opening where pin 466 is inserted, and the connection at pin 432 may then be made such that no "play" occurs.

The force multiplier 430 is connected to the at least one off-center connecting rod 26 by inserting pin 466 through a clevis-type arrangement at one end of force multiplier leg 434 and then through opening 26A in off-center connecting rod 26, where pin 466 is secured (not shown).

Parking brake 420 also includes an actuator 440, shown as a chain, which may be connected to force multiplier 430 at connection point 441 on handle 439.

Thus, force multiplier 430 includes a lever connected to actuator 440 at a first position 441 on the lever 430 and to the at least one off-center connecting rod 26 at a second position, pin 466, on the lever 430 and is supported by the brake cylinder 22 at a third position, at pin 492, on the lever. When a force is applied to actuator or chain 440, force multiplier 430 moves in pull direction 400, which is in the opposite direction of the pull direction described in embodiments 1 and 2 and shown in FIGS. 4–5A. Force multiplier 430 pivots about a substantially fixed rotational axis 432 which is defined generally by the longitudinal axis of pin 492 extending through the hole 463 of continuous boss 487. Rotational axis 432 is located above off-center connecting rod 26, when viewed from the top of force multiplier 430 at connection point 441. Stated another way, the connection, by boss 487 at opening 436, of the force multiplier 430 to the brake cylinder 22 is between the connection, at point 441, of the force multiplier 430 to the actuator 440 and the connection, at pin 466, connecting the at least one off-center connecting rod 26 to the force multiplier 430.

As force multiplier 430 is pulled to the right in direction 400 (as shown in FIGS. 7 and 7A), off-center connecting rod 26 is pulled to the left in an opposite direction, and the brakes are moved to an applied position, as described in the first embodiment.

It is noted that, in embodiments 1–3, as may be the case with other embodiments herein and shown in their respective figures, the linkage connections (i.e., 160, 260, 360) provided the ability for force multipliers 130, 230 and 330 to have an arcuate and somewhat vertical movement when a force was applied. In this fourth embodiment, there is no such linkage connection, and so the elongated opening in leg 434 provides force multiplier 430 with the ability to accommodate the arcuate movement that occurs when a force is applied to the levers of the present invention.

Fifth Embodiment

Figures 8, 8A:
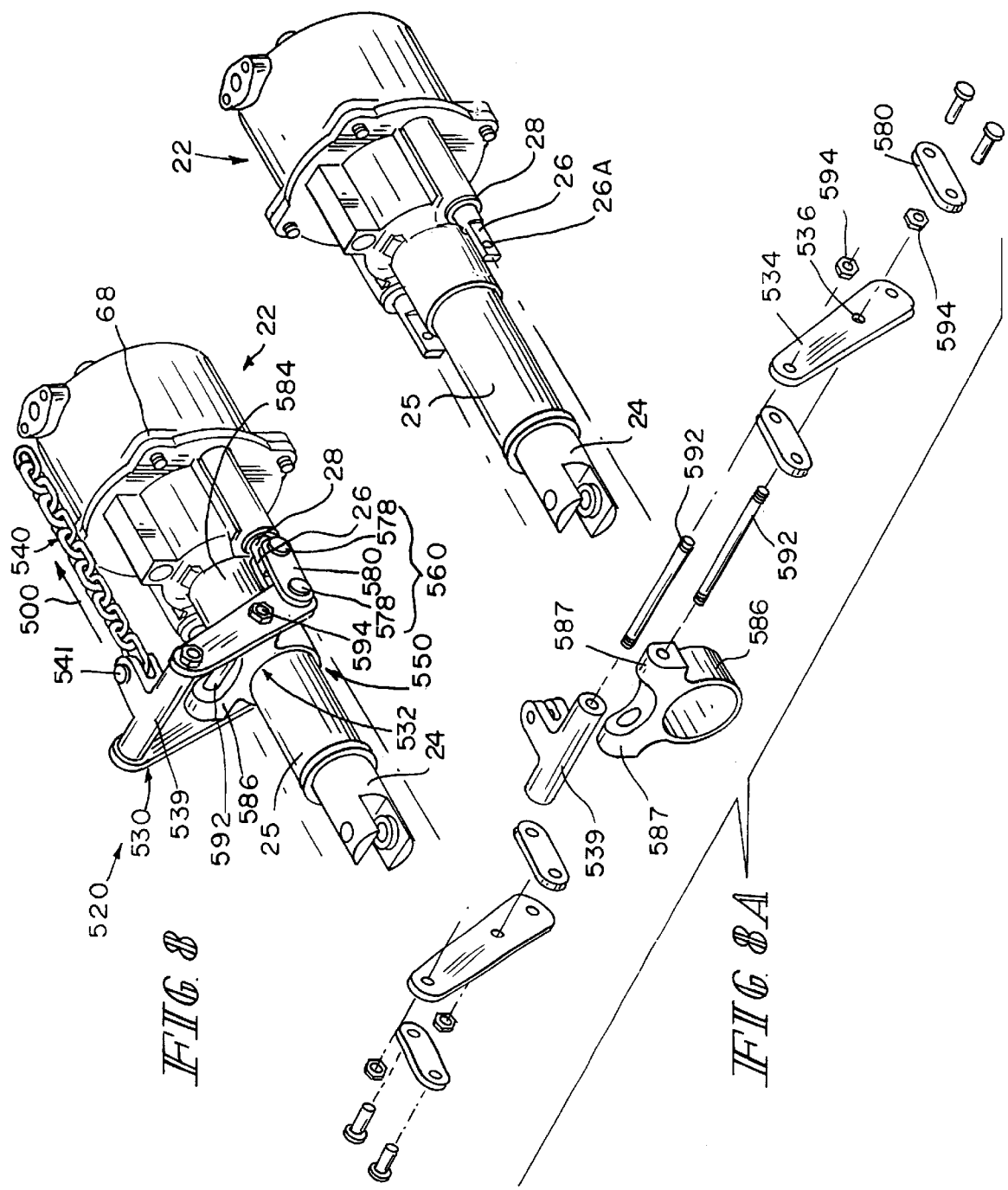
FIG. 8 is a perspective view of a fifth embodiment of a parking brake according to the principles of the present invention.
FIG. 8A is an exploded view of the parking brake of FIG. 8.

The fifth embodiment, shown in FIGS. 8 and 8A, is parking brake 520. Parking brake 520 is essentially the same as, and essentially functions the same as, parking brake 420 described in the fourth embodiment and shown in FIGS. 7 and 7A, but differs in the following ways. Assembly 550 may include a collar 586 that has bifurcated boss 587, as opposed to the continuous boss 487, shown in FIGS. 7 and 7A and described in the fourth embodiment. Supporting member 550 may also include nut 594 to secure pin 592.

Moreover, force multiplier 530 is connected to the at least one off-center connecting rod 26 by a linkage 560, which may include two links 580 and two connector pins 578 for each rod 26. This is different from the connector pin 466 and clevis-type opening at one end of leg 434 that connects force multiplier 430 to rod 26, as shown in FIGS. 7 and 7A and described in the fourth embodiment.

In addition, force multiplier 530 pivots about a substantially fixed rotational axis 532, as defined by pin 592. There is no "play" in the movement about axis 532 because opening 536 on leg 534 is not elongated, and pin 592 is secured by nut 594. As discussed above in the fourth embodiment regarding the arcuate movement of the force multiplier 430, in this fifth embodiment, linkage 560 is configured to permit the arcuate movement.

Thus, force multiplier 530 includes a lever that is connected to actuator 540 at a first position, connection point 541, on the lever 530 and is connected to the at least one connector rod 26 at a second position, pin 578, on the lever 530 and is supported by the brake cylinder 22 at a third position, pin 592, on the lever.

Sixth Embodiment

Figure 9B:
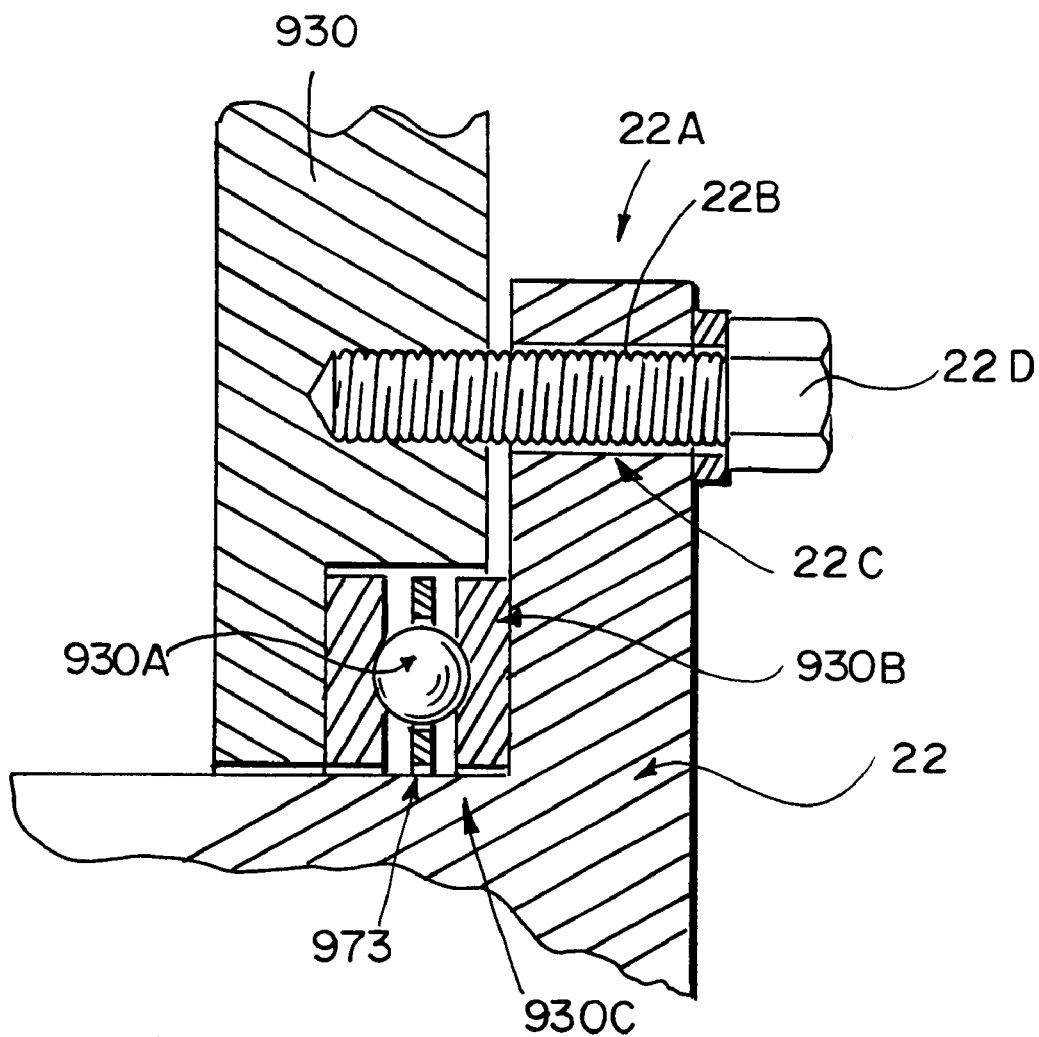
FIG. 9B is a cross-sectional view of the mounting of a cam to a brake cylinder according to the principles of the invention.

A sixth embodiment, shown in FIGS. 9, 9A and 9B, is parking brake 920. The force multiplier 930 is a cam, which may include a cam handle 972 and a cam ramp 974. Cam 930 may also include ball bearings 930A, races 930B, a ball separator or cam sleeve 973 and cam ring 975. The handle 972 and ramp 974 may be connected together as an integral unit, alone or together with cam bracket 976, or cast together as a monolithic unit. Cam ramp 974 may be a single piece or configured to have more than one piece. If, for instance, ramp 974 is in two pieces, cam bracket 976 may be configured such that it would be connected to and mate the pieces of ramp 974 (not shown connected or mated by ramp 974). If handle 972 and ramp 974 are cast or made monolithically, bracket 976 may not be included.

Force multiplier or cam 930 may rest on or be supported by or be attached to brake cylinder 22 as follows. As shown in FIG. 9B, brake cylinder 22 may have a cast boss 22A for shouldering and fastening cam 930. There may be two of these bosses 22A 180° apart. Each boss 22A may have kidney or equivalently shaped slots 22B. These slots 22B may have openings 22C for a fastening bolt 22D. The bolts 22D would be fastened to allow the cam 930 to rotate around the brake cylinder 22. Each slotted end (not shown) of the slotted opening 22B may be used as a cam 930 rotational stop (not shown). The cam 930 and the brake cylinder 22 may contain a thrust bearing 930C, which may be comprised of two races 930B, a ball separator or sleeve 973 and ball bearings 930A.

Alternately, cam 930 may have two kidney shaped slots, 180° apart. Two bolts 22D, one per slot, may be positioned within the slot or slots and fastened to bosses or ears (not shown), 180° apart, cast onto the brake cylinder 22. The bolts 22D may be fastened to allow the cam 930 to rotate around the brake cylinder 22. Each slotted end (not shown) may be used as a cam 930 rotational stop (not shown). The cam 930 and the brake cylinder 22 may contain a thrust bearing 930C, which may be comprised of two races 930B, a ball separator or sleeve 973 and ball bearings 930B. Sleeve 973 retains ball bearings 930A which race on races 930B as shown in FIG. 9B.

The cam 930 may be assembled as a monolithic one-piece cast or machined element or as an assembly of two or more cast or machined parts.

Force multiplier 930 may also include follower 952 and may further include an alignment plate 961. Alignment plate 961 may support follower 952 via opening 967. Alignment plate 961 may be connected to flange 68 by, for instance, bolts or may be cast monolithically with flange 68.

Force multiplier 930 is connected to the at least one off-center connecting rod 26 by follower 952, follower brackets 954 and bolts 959. A first end 956 of follower 952 may sit adjacent to cam 930, and a second end 958 may be connected to follower brackets 954. Follower brackets 954 may be connected to the at least one off-center connecting rod 26 through bolts 959 and opening 26A of rod 26. The follower brackets 954 may also be slidably connected to, or supported by, brake cylinder 22 by, for instance, brake cylinder extension 984. Alternatively, brackets 954 may be separate (single or dual) brackets connected individually or in pairs to off-center connecting rods 26. In addition, brackets 954 may be without any curved portion and, therefore, not supported by the brake cylinder extension 984 or by the brake cylinder 22 at all, except through follower 952 and alignment plate 961.

Parking brake 920 also includes an actuator 940, shown as a chain, which may be connected to force multiplier 930 at connection point 941 on handle 939.

When a force is applied to actuator or chain 940, force multiplier 930 is pulled in direction 900. Force multiplier 930 pivots or rotates about axis 964, which is substantially the longitudinal center line axis of brake cylinder 22. As force multiplier 930 is pulled in direction 900, cam ramp surface 977 rotates and also moves in direction 900 moving follower 952 to the left in direction 900A at substantially a 90° angle from direction of pull 900. That movement of follower 952, in turn, pulls off-center connecting rod 26 in direction 900A causing the rail car's brakes to be moved to an applied position, as described in the first embodiment.

The arc movement of handle 939, radius of brake cylinder 22 and length of handle 939 all may help establish the force and distance ratios of multiplier 930.

Seventh Embodiment

A seventh embodiment, shown in FIGS. 10 and 10A, is parking brake 1020. The force multiplier 1030, shown as a handle, may include arms 1035, 1037 of differing lengths, as measured linearly from the vertical plane of pivot axis 1096. Handle 1030 may include a handle pin 1031 and handle openings 1033. The differing lengths of arms 1035 and 1037, as measured from the vertical plane of pivot axis 1096, may establish the force and distance ratios of force multiplier 1030.

Force multiplier 1030 is supported by a brake cylinder 22 through mounting plate 1065 and boss 1069. Boss 1069 may be connected integrally, for instance, by welding, or cast monolithically with plate 1065. Mounting plate 1065 may be connected to flange 68 on brake cylinder 22 by, for instance, bolts. Force multiplier 1030 is connected to mounting plate 1065 by inserting pin 1031 into and through mounting plate boss 1069 and securing pin 1031 at the other end (not shown).

Force multiplier 1030 may be pivotally connected to the at least one off-center connecting rod 26 by assembly 1050. Assembly 1050 may include chain 1091, legs 1099 and pin 1066. Legs 1099 may have a clevis-type opening at one end. Chain 1091 connects to force multiplier 1030 at point 1033 and to legs 1099 at connection point 1099A. Legs 1099 are connected to the at least one off-center connecting rod via pin 1066 through a clevis-like opening on leg 1099 and further through opening 26A in rod 26.

Leg or legs 1099 are configured to be essentially a one-to-one (1:1) lever but may be configured to be a force multiplier by changing the dimension or distance between selected connection positions on the lever at which the lever connects to elements of a parking brake (e.g., a first position connecting to an actuator, a second position connecting to a off-center connecting rod and a third position connecting to a brake cylinder). If the legs 1099 are so configured as a force multiplier, such a force multiplier could supplement or even replace the force multiplier 1030, as described herein.

Force multiplier 1030 is connected to, or supported by, brake cylinder 22 via flexible linkage 1060. Linkage 1060 may include chain 1091, legs 1099, pins 1078, link 1080 and boss 1093. Chain 1091 connects force multiplier 1030 to legs 1099 at connection point 1099A. Link 1080 connects to legs 1099 via pin 1078 and connects to brake cylinder 22 via boss 1093, pin 1078 and to boss 1097 on brake cylinder 22 via a pin or screw or equivalent connector (not shown).

Boss 1097 is an alternative to, say, boss 587 in FIG. 8 or plate 165 in FIG. 4 as a way to connect a lever, such as force multiplier 1030 or a converted force multiplier made from legs 1099, to brake cylinder 22. Moreover, should legs 1099 be configured as a force multiplier, the resulting force multiplier may be similar to that of the third embodiment of FIGS. 6 and 6A in that the third position on the lever (e.g., where the brake cylinder supports the force multiplier) is between the first and second positions on the lever, although the off-center connecting rods 26 of the third embodiment are shown rotated approximately 90° from the location of the off-center connecting rods 26 of this seventh embodiment.

When actuator or chain 1040 is pulled, it exerts a force on force multiplier 1030 in pull direction 1000. Force multiplier 1030 pivots about a substantially fixed rotational axis, which may be offset and in a plane substantially perpendicular to the longitudinal center-line axis 1064 of brake cylinder 22, as shown in FIGS. 10 and 10A. As force multiplier 1030 is pulled in direction 1000 and rotates about axis 1096, legs 1099 are pulled in direction 1000A and rotate about the axis defined by pin 1078 and link 1080, thereby pulling off-center connecting rod 26 to the left (as shown in FIGS. 10 and 10A) in a direction opposite of direction 1000A, which then moves the rail car's brakes to an applied position, as described in the first embodiment.

Eighth Embodiment

An eighth embodiment, shown in FIGS. 11 and 11A, is parking brake 1120. The arrangement of parking brake 1120 is similar to the arrangement of parking brake 1020, described in the seventh embodiment and shown in FIGS. 10 and 10A, with the exception of what follows and with the differences being evident in the drawings of the two embodiments.

Force multiplier 1130 may include a handle and a symmetrical curved surface or a wheel. Force multiplier 1130 may also include handle arms 1138 and 1138A of differing or equal lengths, as measured from pivot axis 1196. Symmetrical curved surface or a wheel 1145 may have a radius equal to or different from the lengths of the arms 1138 and 1138A. The differing lengths of arm 1138 and radius of wheel 1145 may help establish the force and distance ratios of multiplier 1130.

Force multiplier 1130 is supported by a brake cylinder 22 through mounting block 1198. Mounting block 1198 may be connected integrally to brake cylinder 22 by, for instance, bolts or welding, or cast with the brake cylinder 22 as a monolithic unit. Force multiplier 1130 is connected to mounting block 1198 by inserting arm 1138 into hole 1198A and securing arm 1138A (the securing part is not shown).

Force multiplier 1130 may also be pivotally connected to the at least one off-center connecting rod 26 and to the brake cylinder 22, as described in the seventh embodiment and shown in FIGS. 10 and 10A. However, one difference from the seventh embodiment may be the connection between force multiplier 1030 and legs 1099. In this eighth embodiment, chain portion 1140A, as shown in FIGS. 11 and 11A, serves the same function as chain 1091 in the seventh embodiment, as shown in FIGS. 10 and 10A. Chain 1140A may be connected to wheel 1145 at connection point 1145A. Chain 1140A will wrap around wheel 1145 as it turns in a counterclockwise direction 1100B.

Parking brake 1120 also includes an actuator 1140, shown as a chain. Chain 1140 may be connected to force multiplier arm 1138 at connection point 1141.

When chain 1140 is pulled, it exerts a force on multiplier 1130 in pull direction 1100. Force multiplier 1130 pivots about the substantially fixed rotational axis 1196. Rotational axis 1196 may be offset and in a plane substantially perpendicular to the longitudinal center-line axis 1064 of brake cylinder 22, as shown in FIG. 10A. As chain 1140 is pulled in direction 1100, chain portion 1140A is being pulled in direction 1100A. Parking brake 1120 operates essentially the same as parking brake 1020 in applying the rail car's brakes.

Ninth Embodiment

A ninth embodiment, shown in FIGS. 12 and 12A, is parking brake 1220. The arrangement of parking brake 1220 is similar to the arrangement of parking brake 1120, described in the eighth embodiment and shown in FIGS. 11 and 11A, with the exception of what follows and with the differences being evident in the drawings of the two embodiments.

Force multiplier 1230 includes an asymmetrical curved surface element configured substantially as shown in FIGS. 12 and 12A. Force multiplier 1230 may include a boss 1279 that is connected integrally to, for instance, by welding, or cast monolithically with curved element 1230. Force multiplier 1230 pivots about axis 1296. The force and distance ratios for force multiplier 1230 may be determined by the horizontal distances, measured in the same horizontal plane, between the pivot axis 1296 and contact point 1247, and the pivot axis 1296 and contact point 1249, as shown in FIGS. 12 and 12A.

Force multiplier 1230 is supported by the brake cylinder 22 through pin 1289 and boss 1290. Boss 1290 may be connected integrally to, for instance, by welding, or cast monolithically with brake cylinder 22 and/or flange 68. Force multiplier 1230 is connected to brake cylinder 22 by inserting pin 1289 into boss 1290 and securing pin 1289 (not shown).

Force multiplier 1230 may also be pivotally connected to the at least one off-center connecting rod 26, as described in the seventh and eighth embodiments (FIGS. 10–11A) and as shown in FIGS. 12 and 12A.

Chain 1240 is the actuator for parking brake 1220. Chain 1240 may be one continuous chain (including a portion 1240A) connected to legs 1299 by pin 1278. Chain 1240 may also be connected to force multiplier 1230 beginning at chain contact point 1247 and by riding along the outer surface of force multiplier 1230 to contact point 1249. Curved surface element 1230 is mounted on, or cast monolithically with, boss 1279 at a sufficient angle to have chain 1240 wrap around the outer surface of force multiplier 1230 such that when chain 1240 is pulled in direction 1200, chain 1240 clears chain portion 1240A.

When chain 1240 is pulled in direction 1200, it exerts a force on force multiplier 1230. Force multiplier 1230 pivots about the substantially fixed rotational axis 1296. Rotational axis 1296 may be offset and in a plane substantially perpendicular to the longitudinal center-line axis 1064 of brake cylinder 22, as shown in FIG. 10A. As force multiplier 1230 is pulled in direction 1200, parking brake 1220 operates essentially the same as parking brake 1120 in applying the rail car's brakes.

Figure 13:
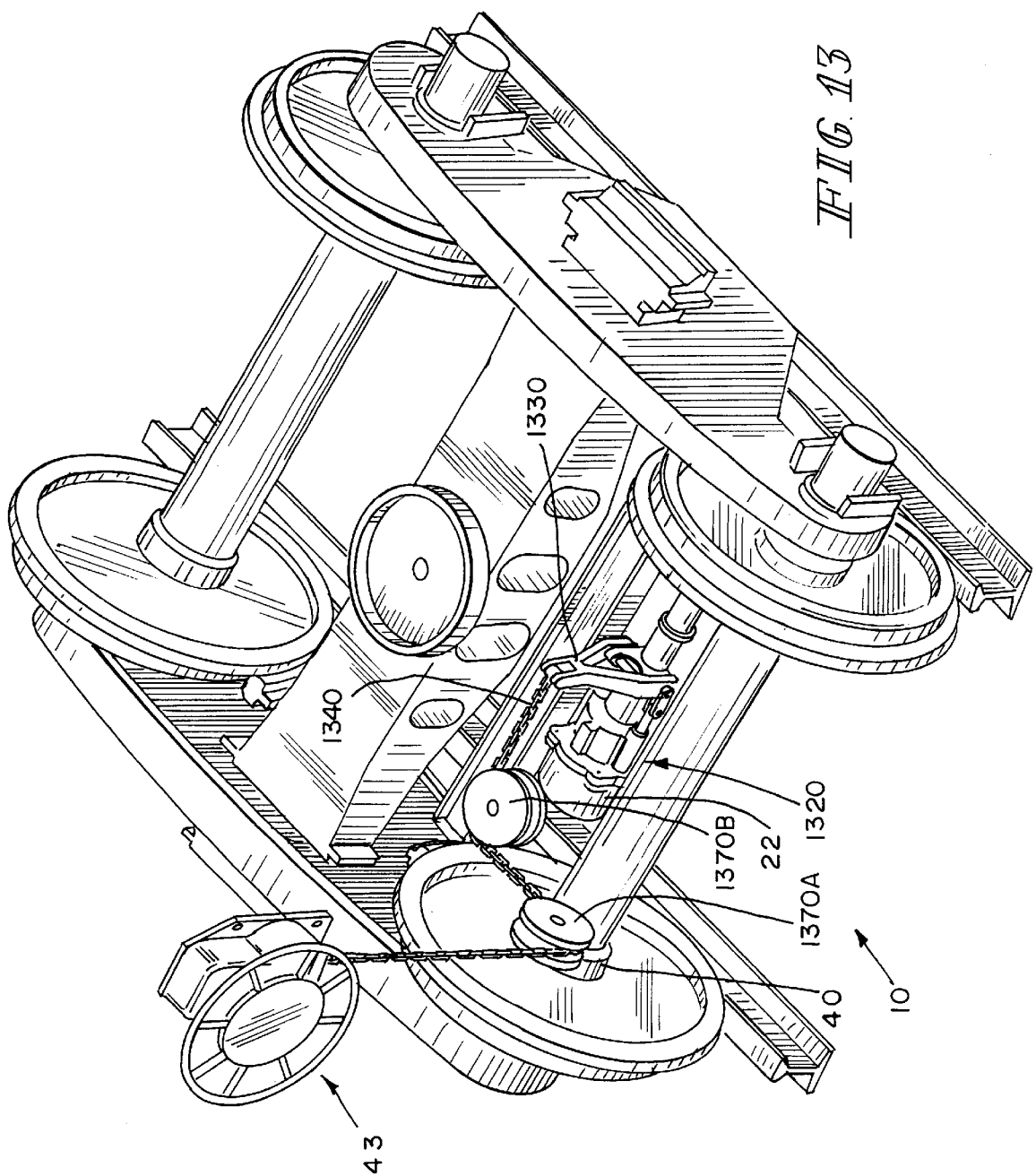
FIG. 13 is a perspective view of a parking brake system installed on a rail car according to the principles of the present invention.

FIG. 13 shows an example of a parking brake, according to the principles of this invention, installed on a rail car. Hand wheel 23 and sheave wheel 1370A are mounted on a rail car (not shown here). Parking brake 1320 is mounted on a rail car truck 10 and shown are brake cylinder 22, force multiplier 1330, actuator chain 1340 and sheave wheel 1370B connected to brake cylinder 22. Turning wheel 43 pulls chain 1340 and parking brake 1320 operates essentially the same as described herein for similar embodiments in applying the rail car's brakes.

Generally, for the first six embodiments shown in FIGS. 4–9A herein, the structure connecting the force multipliers to the at least one off-center connecting rod 26 may comprise only non-flexible connecting elements, such as, for example, clevis 162, link 280, pin 278 and follower brackets 954. On the other hand, for the embodiments 7–9 shown in FIGS. 10–12A, that connecting structure may comprise both flexible and non-flexible elements.

It should also be noted that any of the force multipliers in embodiments 7–9 may be interchangeable, in that the force multiplier on any particular embodiment may be replaced by one of the other force multipliers, and the mounting location of the force multipliers may also be interchangeable as well.

Although the present invention has been described and illustrated in detail, it is to be clearly understood that the same is by way of illustration and example only and is not to be taken as limiting. The spirit and scope of the present invention are to be limited only by the terms of the appended claims.

What is claimed:

1. A parking brake for a rail vehicle comprising;
   a brake cylinder and a piston in the brake cylinder responsive to forces to apply and release brakes on the vehicle;
   at least one off-center connecting rod extending through an opening in the non-pressure side of the brake cylinder and connected to the piston through the opening;
   a force multiplier supported by the brake cylinder and connected to the at least one off-center connecting rod; and,
   an actuator connected to the force multiplier for driving the force multiplier to provide the force to move the at least one off-center connecting rod and the piston to move the brakes to an apply position.

2. The parking brake of claim 1, further including a non-flexible connector connecting the force multiplier to the at least one off-center connecting rod.

3. The parking brake of claim 1, wherein the force multiplier is one of a bifurcated member, a cam, a multiplier handle, a multiplier wheel and handle, and a multiplier curved surface.

4. The parking brake of claim 1, wherein the force multiplier is a bifurcated member and the bifurcated member rotates about one of a point where the force multiplier is supported by the brake cylinder and a point adjacent to where the force multiplier is supported by the brake cylinder.

5. The parking brake of claim 1, wherein the force multiplier is a cam and the cam rotates about a longitudinal center-line axis of the brake cylinder.

6. The parking brake of claim 5, including at least one cam follower connecting the cam to the at least one off-center connecting rod.

7. The parking brake of claim 6, including a cam bracket connecting the cam follower to the at lest one off-center connecting rod.

8. The parking brake of claim 7, wherein the follower is supported by the brake cylinder.

9. The parking brake of claim 8, wherein the follower extends through a plate on the brake cylinder.

10. The parking brake of claim 5, wherein the cam includes a cam handle and a ramp formed as one of an integral cam unit and a monolithic cam unit and connected to the brake cylinder, wherein the cam handle is connected to the actuator.

11. The parking brake of claim 3, wherein the multiplier is pivotally mounted to the brake cylinder to rotate about an axis that lies generally in a plane that is substantially perpendicular to a longitudinal center-line axis of the brake cylinder.

12. The parking brake of claim 2, wherein the brake cylinder supports the non-flexible connector.

13. The parking brake of claim 2, wherein the brake cylinder has a flange and the flange supports at least one of the non-flexible connector and the multiplier.

14. The parking brake of claim 1, wherein the at least one off-center connecting rod is two off-center connecting rods extending through individual openings in the brake cylinder and connected to the piston through the openings, and the force multiplier is connected to both off-center connecting rods.

15. The parking brake of claim 1, wherein the multiplier includes a lever connected to the actuator at a first position on the lever, to the at least one off-center connecting rod at a second position on the lever and is supported by the brake cylinder at a third position on the lever.

16. The parking brake of claim 15, wherein the second position is between the first and third positions on the lever.

17. The parking brake of claim 15, wherein the third position is between the first and second positions on the lever.

18. The parking brake of claim 15, including a linkage connecting the third position of the lever to the brake cylinder, and the second position of the lever is pivotally connected to the at least one off-center connecting rod.

19. The parking brake according to claim 18, including a mounting plate on the brake cylinder, and the linkage connects the third position on the lever to the mounting plate.

20. The parking brake according to claim 18, including a boss on the brake cylinder, and the linkage connects the third position on the lever to the boss.

21. The parking brake of claim 15, including a linkage connecting the second position of the lever to the at least one off-center connecting rod, and the third position of the lever is pivotally connected to the brake cylinder.

22. The parking brake according to claim 21, including a boss on the brake cylinder, and a pin connects the second position on the lever to the boss.

23. The parking brake of claim 15, wherein the second position of the lever is directly connected to the at least one off-center connecting rod, and the third position of the lever is pivotally connected to the brake cylinder.

24. The parking brake according to claim 23, including a boss on the brake cylinder, and the third position on the lever is pivotally connected to the boss.

25. The parking brake according to claim 23, wherein the lever includes an oblong opening at one of the second and third positions.

26. The parking brake according to claim 11, wherein the axis of rotation of the multiplier is perpendicular and offset from the longitudinal axis of the brake cylinder.

27. The parking brake according to claim 11, wherein the multiplier includes a curved surface operatively connected to a flexible connector which is connected to the at least one off-center connecting rod.

28. The parking brake according to claim 27, wherein the curved surface is symmetrical about the rotational axis.

29. The parking brake according to claim 27, wherein the curved surface is asymmetrical about the rotational axis.

30. The parking brake according to claim 11, wherein the multiplier includes two non co-linear legs extending from the rotational axis.

31. A parking brake for a rail vehicle comprising:
   a brake cylinder and a piston in the brake cylinder responsive to forces to apply and release brakes on the vehicle;
   at least one off-center connecting rod extending through an opening in the non-pressure side of the brake cylinder and connected to the piston through the opening,
   a force multiplier;
   a non-flexible connector directly connecting the force multiplier to the at least one off-center connecting rod; and,
   an actuator connected to the force multiplier for driving the force multiplier to provide the force through the non-flexible connector to move the at least one off-center connecting rod and the piston to move the brakes to an apply position.

32. The parking brake of claim 31, wherein the force multiplier is a bifurcated member and the bifurcated member rotates about one of a point where the force multiplier is supported by the brake cylinder and a point adjacent to where the force multiplier is supported by the brake cylinder.

33. The parking brake of claim 31, wherein the force multiplier is a cam and the cam rotates about a longitudinal center-line axis of the brake cylinder.

34. The parking brake of claim 31, wherein the brake cylinder supports at least one of the force multiplier and the non-flexible connector.

35. The parking brake of claim 31, wherein the brake cylinder has a flange and the flange supports at least one of the force multiplier and the non-flexible connector.

36. The parking brake of claim 31, wherein the non-flexible connector extends between and directly connects the force multiplier to the at least one off-center connecting rod.

37. The parking brake of claim 31, wherein the multiplier includes a lever connected to the actuator at a first position on the lever, to the at least one off-center connecting rod at a second position on the lever and is supported by the brake cylinder at a third position on the lever.

38. The parking brake of claim 37, wherein the second position is between the first and third positions on the lever.

39. The parking brake of claim 37, wherein the third position is between the first and second positions on the lever.

40. The parking brake of claim 37, including a linkage connecting the third position of the lever to the brake cylinder, and the second position of the lever is pivotally connected to the at least one off-center connecting rod.

41. A parking brake for a rail vehicle comprising:
- a brake cylinder and a piston in the brake cylinder responsive to forces to apply and release brakes on the vehicle;
- at least one off-center connecting rod extending through an opening in the brake cylinder and connected to the piston through the opening;
- a force multiplier supported by the brake cylinder and connected to the at least one off-center connecting rod; and
- an actuator connected to the force multiplier for driving the force multiplier to provide the force to move the at least one off-center connecting rod and the piston to move the brakes to an apply position.

* * * * *